(12) United States Patent
Desmarais et al.

(10) Patent No.: US 7,393,878 B2
(45) Date of Patent: Jul. 1, 2008

(54) METHOD FOR CURING HIGH INTERNAL PHASE EMULSIONS

(75) Inventors: Thomas Allen Desmarais, Cincinnati, OH (US); Mark Lewis Agerton, Mason, OH (US); Paul Martin Lipic, West Chester, OH (US); Daniel Joseph Valerio, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 512 days.

(21) Appl. No.: 11/070,322

(22) Filed: Mar. 2, 2005

(65) Prior Publication Data

US 2005/0197415 A1    Sep. 8, 2005

Related U.S. Application Data

(60) Provisional application No. 60/549,249, filed on Mar. 2, 2004.

(51) Int. Cl.
   *C08J 9/28*    (2006.01)
(52) U.S. Cl. .............................. 521/63; 521/64; 264/41
(58) Field of Classification Search ................. 521/63, 521/64
   See application file for complete search history.

(56) References Cited

U.S. PATENT DOCUMENTS

| | | | |
|---|---|---|---|
| 3,854,864 A | 12/1974 | Mendoza | |
| 4,128,678 A | 12/1978 | Metcalfe et al. | |
| 4,589,845 A | 5/1986 | Naohara et al. | |
| 4,662,085 A | 5/1987 | Russo et al. | |
| 4,775,502 A * | 10/1988 | Chafvin, Jr. ................ | 264/41 |
| 5,149,720 A | 9/1992 | DesMarais et al. | |
| 5,210,104 A | 5/1993 | Bass et al. | |
| 5,252,619 A | 10/1993 | Brownscombe et al. | |
| 5,260,345 A | 11/1993 | DesMarais et al. | |
| 5,268,224 A | 12/1993 | DesMarais et al. | |
| 5,331,015 A | 7/1994 | DesMarais et al. | |
| 5,353,520 A | 10/1994 | Gouge et al. | |
| 5,387,207 A | 2/1995 | Dyer et al. | |
| 5,415,274 A | 5/1995 | Krismanth et al. | |
| 5,500,451 A | 3/1996 | Goldman et al. | |
| 5,632,737 A | 5/1997 | Stone et al. | |
| 5,633,291 A | 5/1997 | Dyer et al. | |
| 5,634,281 A | 6/1997 | Nugent | |
| 5,650,222 A | 7/1997 | DesMarais et al. | |
| 5,729,913 A | 3/1998 | Rucker | |
| 5,753,359 A | 5/1998 | Dyer et al. | |
| 5,770,634 A | 6/1998 | Dyer et al. | |
| 5,786,395 A | 7/1998 | Stone et al. | |
| 5,795,921 A | 8/1998 | Dyer et al. | |
| 5,817,704 A | 10/1998 | Shiveley et al. | |
| 5,827,909 A | 10/1998 | DesMarais | |
| 6,160,028 A | 12/2000 | Dyer | |
| 6,166,097 A | 12/2000 | Yonemura et al. | |
| 6,207,724 B1 | 3/2001 | Hird et al. | |
| 6,294,052 B1 | 9/2001 | Garcia | |
| 6,299,808 B1 | 10/2001 | Mork et al. | |
| 6,362,243 B1 | 3/2002 | Sasabe et al. | |
| 6,365,642 B1 | 4/2002 | Dyer et al. | |
| 6,369,121 B1 | 4/2002 | Catalfamo et al. | |
| 6,462,100 B1 | 10/2002 | Thunhorst et al. | |
| 6,550,960 B2 | 4/2003 | Catalfamo et al. | |

FOREIGN PATENT DOCUMENTS

WO    WO 97/37745 A1    10/1997

OTHER PUBLICATIONS

Oertel, G., *Polyurethane Handbook*.
Gibson, L. J., et al., *Cellular Solids, Structure and Properties*; Pergamon Press, Oxford (1988).
Williams, J.M., *Langmuir*, 7, pp. 1370-1377 (1991).
Bhumgara, Z., *Filtration & Separation*, pp. 245-252 (Mar. 1005).
Walsh, et al., *J. Aerosol Sci.*, 27, pp. 5629-5630 (1996).

* cited by examiner

*Primary Examiner*—Irina S Zemel
(74) *Attorney, Agent, or Firm*—James E. Oehlenschlager; Angela M. Stone; David M. Weirich

(57) ABSTRACT

The present invention is directed to a method for reducing monomer loss during curing of a high internal phase emulsion. The method has the steps of: forming a water-in-oil emulsion, curing the monomer component in the emulsion in a saturated steam environment, and forming a saturated polymeric foam material. The water-in-oil emulsion has an aqueous phase and an oil phase comprising a monomer component.

11 Claims, 3 Drawing Sheets

METHOD FOR CURING HIGH INTERNAL PHASE EMULSIONS

CROSS-REFERENCE TO RELATED APPLICATION

This application claims the benefit of U.S. Provisional Application No. 60/549,249, filed Mar. 2, 2004.

FIELD OF THE INVENTION

The present invention relates to a method for curing a high internal phase emulsion. More specifically, the present invention relates to a method for reducing monomer loss during curing of a high internal phase emulsion.

BACKGROUND OF THE INVENTION

The development of microporous foams is the subject of substantial commercial interest. Such foams have found utility in various applications, such as thermal, acoustic, electrical, and mechanical (e.g., for cushioning or packaging) insulators; absorbent materials; filters; membranes; floor mats; toys; carriers for inks, dyes, lubricants, and lotions; and the like. References describing such uses and properties of foams include Oertel, G., "Polyurethane Handbook"; Hanser Publishers: Munich, 1985, and Gibson, L. J.; Ashby, M. F., "Cellular Solids. Structure and Properties"; Pergamon Press: Oxford, 1988. The term "insulator" refers to any material which reduces the transfer of energy from one location to another. The term "absorbent" refers to materials which imbibe and hold or distribute fluids, usually liquids, an example being a sponge. The term "filter" refers to materials which pass a fluid, either gas or liquid, while retaining impurities within the material by size exclusion, interception, electrostatic attraction, adsorption, etc. Other uses for foams are generally obvious to one skilled in the art.

Open-celled foams prepared from High Internal Phase Emulsions (hereinafter referred to as "HIPE") are particularly useful in a variety of applications including absorbent disposable articles (U.S. Pat. No. 5,331,015 (DesMarais et al.) issued Jul. 19, 1994, U.S. Pat. No. 5,260,345 (DesMarais et al.) issued Nov. 9, 1993, U.S. Pat. No. 5,268,224 (DesMarais et al.) issued Dec. 7, 1993, U.S. Pat. No. 5,632,737 (Stone et al.) issued May 27, 1997, U.S. Pat. No. 5,387,207 (Dyer et al.) issued Feb. 7, 1995, U.S. Pat. No. 5,786,395 (Stone et al.) Jul. 28, 1998, U.S. Pat. No. 5,795,921 (Dyer et al.) issued Aug. 18, 1998), insulation (thermal, acoustic, mechanical) (U.S. Pat. No. 5,770,634 (Dyer et al.) issued Jun. 23, 1998, U.S. Pat. No. 5,753,359 (Dyer et al.) issued May 19, 1998, and U.S. Pat. No. 5,633,291 (Dyer et al.) issued May 27, 1997), filtration (Bhumgara, Z. *Filtration & Separation* 1995, March, 245-251; Walsh et al. *J. Aerosol Sci.* 1996, 27, 5629-5630; published PCT application W/O 97/37745, published on Oct. 16, 1997, in the name of Shell Oil Co.), and various other uses. The HIPE process provides facile control over the density, cell and pore size and distribution, proportion of cell struts to windows, and porosity in these foams.

Economics is an important issue in making HIPE foams commercially attractive. Especially, it is important to make HIPE efficiently and with cost effective equipment. There are some attempts to achieve the goal; however there is still a substantial opportunity for substantial improvement of efficiency during the process for making HIPE. Accordingly, it would be desirable to develop a method for reducing material loss during the process for making and curing the HIPE and to use cost effective equipment.

SUMMARY OF THE INVENTION

The present invention relates to a method for reducing monomer loss during curing of HIPE. The method has the steps of a) forming a water-in-oil emulsion having an aqueous phase and an oil phase containing a monomer component; b) curing the monomer component in the emulsion in a saturated steam environment with a quiescent atmospheric layer above the emulsion; and c) forming a saturated polymeric foam material. In the present invention, the monomer loss can be less than 10%, preferably less than 5%, and more preferably less than 3.5%.

Preferably, the saturated steam is in equilibrium with the emulsion's aqueous component and a small headspace is in equilibrium with the monomer component. As a result, the evaporation or disruption of the emulsion is prevented. Preferably, the headspace is less than 80 mm, preferably less than 40 mm.

In another embodiment, the method of the present invention has the steps of a) forming a water-in-oil emulsion; b) curing the emulsion in a saturated steam environment in an oven which is preferably a serpentine design which can preferably be formed from belts; and c) forming a saturated polymeric form material. Preferably, the oven can have exit and entrance points which are covered to minimize steam loss but allow entry of the emulsion and exit of the cured emulsion product.

The present invention may provide a method for avoiding monomer loss during the curing process. Also, the present invention may provide a method for using a space of an oven more efficiently during the curing process.

DETAILED DESCRIPTION OF THE INVENTION

I. Definitions

Figure 1:
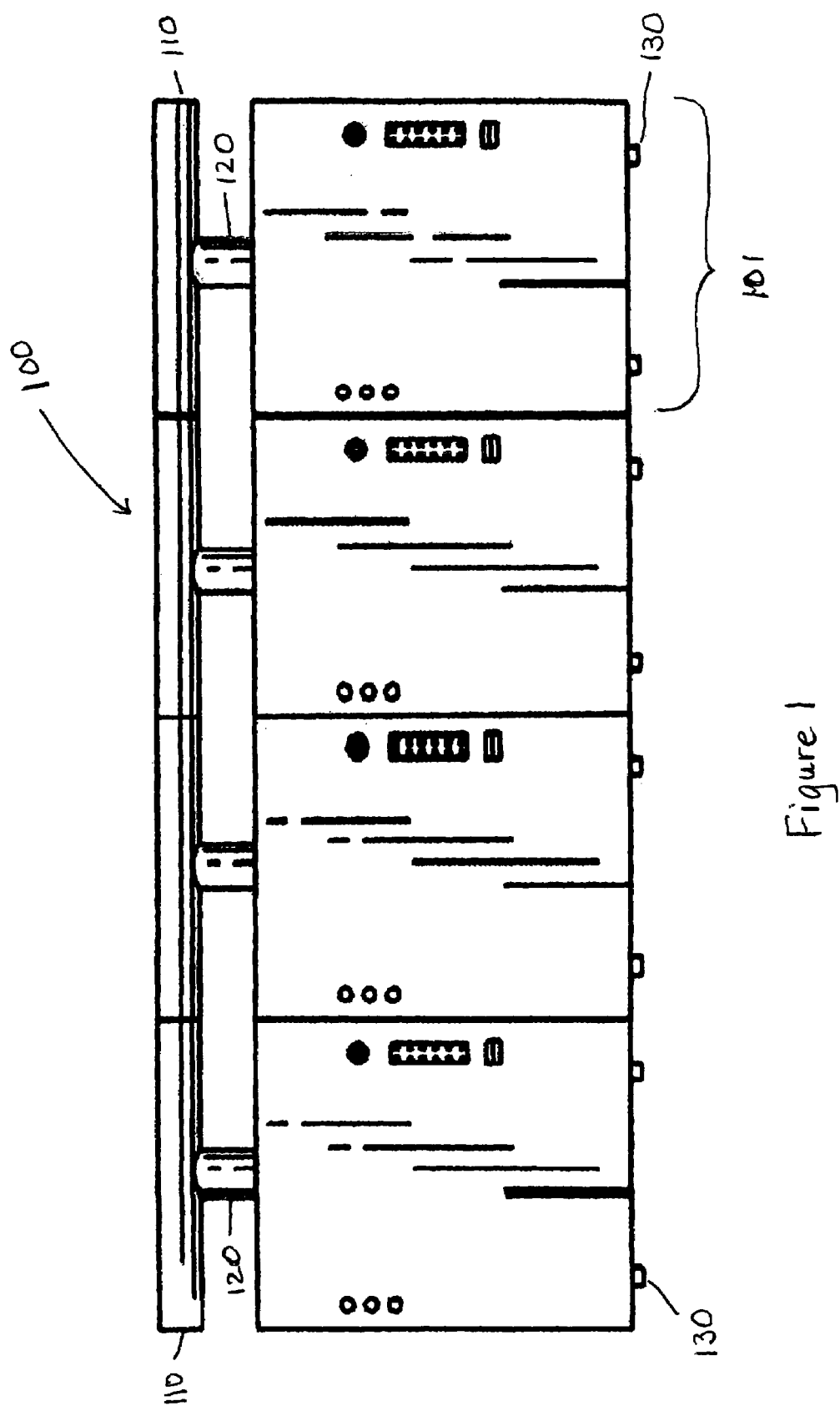
FIG. 1 describes an overall view of an oven suitable for forming HIPE foams according to the present invention.

The following definitions are offered relative to the current invention.

All percentages, ratios and proportions herein are by weight of the final composition, unless otherwise specified. But we refer to volume to weight ratio in the body. All temperatures are in degrees Celsius (° C.) unless otherwise specified.

As used herein, the term "comprising" and its derivatives, as used herein, are intended to be open ended terms that specify the presence of the stated features, elements, components, groups, integers, and/or steps, but do not exclude the presence of other, unstated features, elements, components, groups, integers, and/or steps. This definition also applies to words of similar meaning, for example, the terms "have", "include", "be provided with" and their derivatives. It also means that other steps, structures, elements, etc. which do not affect the end result can be added. This term encompasses the terms "consisting of" and "consisting essentially of".

"Curing" is the process of converting a HIPE to a HIPE foam. Curing involves the polymerization of monomers into polymers. A further step included in the curing process is crosslinking. A cured HIPE foam is one which has the physical properties, e.g., mechanical integrity, to be handled in subsequent processing steps (which may include a post-curing treatment to confer the final properties desired). Generally, curing is effected via the application of heat. An indication of the extent of cure is the mechanical strength of the foam, as measured by yield stress using the method described in the Test Methods section below.

"Polymerization" is the part of the curing process whereby the monomers of the oil phase are converted to a relatively high molecular weight polymer.

"Crosslinking" is the part of the curing process whereby monomers having more than one functional group with respect to free radical polymerization are copolymerized into more than one chain of the growing polymer.

A "batch" process for producing HIPE foam generally involves collecting the HIPE in a specific container in which the HIPE is cured. "Batch" would include processes wherein multiple small containers of relatively sophisticated shapes are used to collect the HIPE. Such shaped vessels can provide for "molded" shapes having three-dimensional features. A "continuous" process for producing HIPE foam generally involves collecting the HIPE on a moving web or within a pipe or tube or manifold which may pass through a heating zone and produce a continuous element of cured HIPE foam of varied shape and cross-section.

The term "equilibrium" is used to describe the atmosphere above the HIPE. Specifically, the saturated steam is in equilibrium with the emulsion's aqueous component and the small headspace is in equilibrium with the monomer component. Equilibrium is defined to mean that there is a reduced driving force for molecules to leave the material and go into the head space. The fully saturated water vapor phase reduces any water evaporation and helps to prevent molecules from leaving the material. Equilibrium is not used to mean that the composition, temperature, and pressure are the same in the material and the headspace.

A. General Foam Materials

1. Oil Phase Components

The continuous oil phase of the HIPE comprises monomers that are polymerized to form the solid foam structure and the emulsifier necessary to stabilize the emulsion. In general, the monomers will include from about 20 to about 97% by weight of at least one substantially water-insoluble monofunctional alkyl acrylate or alkyl methacrylate. Exemplary monomers of this type include $C_4$-$C_{18}$ alkyl acrylates and $C_2$-$C_{18}$ methacrylates. Preferred monomers of this type include 2-ethylhexyl acrylate, n-butyl acrylate, hexyl acrylate, n-octyl acrylate, n-nonyl acrylate, n-decyl acrylate, isodecyl acrylate, n-tetradecyl acrylate, benzyl acrylate, nonyl phenyl acrylate, n-hexyl methacrylate, 2-ethylhexyl methacrylate, n-octyl methacrylate, n-nonyl methacrylate, n-decyl methacrylate, isodecyl methacrylate, n-dodecyl methacrylate, n-tetradecyl methacrylate, and n-octadecyl methacrylate. As the level of these monomers in the oil phase formulation is increased, the Tg of the resulting polymeric HIPE foam tends to be reduced. This group of monomers is referred to as Tg lowering monomers and will generally comprise 20% to about 97%, more preferably 45% to about 70%, by weight of the monomer component.

The oil phase will also comprise from about 2 to about 50% by weight of a substantially water-insoluble, polyfunctional crosslinking alkyl acrylate or methacrylate. This crosslinking comonomer, or crosslinker, is added to confer strength and resilience to the resulting HIPE foam. Exemplary crosslinking monomers of this type comprise monomers containing two or more activated acrylate and/or methacrylate groups. These generally are the result of condensation reaction of acrylic acid or methacrylic acid with polyfunctional alcohols. Nonlimiting examples of this group include 1,6-hexanedioldiacrylate, 1,4-butanedioldimethacrylate, trimethylolpropane triacrylate, trimethylolpropane trimethacrylate, 1,12-dodecyldimethacrylate, 1,14-tetradecanedioldimethacrylate, ethylene glycol dimethacrylate, neopentyl triacrylate, glucose pentaacrylate, sorbitan pentaacrylate, and the like. Such di-, tri-, tetra-, and higher acrylates and methacrylates as provided by suppliers often contain impurities such as incompletely esterified alcohols that may be inimical to emulsion formation and stability. It can be useful, as detailed hereinafter, to remove these alcohols at least partially to improve emulsion stability and formation quality of the resulting HIPE foams.

Any third substantially water-insoluble comonomer may be added to the oil phase in weight percentages of from about 0% to about 10%, preferably from about 2% to about 8%, to modify properties in other ways. In certain cases, "toughening" monomers may be desired which impart toughness to the resulting HIPE. These include monomers such as styrene, vinyl chloride, isoprene, and chloroprene. Without being bound by theory, it is believed that such monomers aid in stabilizing the HIPE during curing to provide a more homogeneous and better formed HIPE foam which results in better toughness, tensile strength, abrasion resistance, etc. Monomers may also be added to confer flame retardancy as disclosed in U.S. Pat. No. 6,160,028 to Dyer. Monomers may be added to confer color (e.g., vinyl ferrocene), fluorescent properties, radiation resistance, opacity to radiation (e.g., lead tetraacrylate), to disperse charge, to reflect incident infrared light, to absorb radio waves, to form a wettable surface on the HIPE foam struts, or for any other purpose. In some cases, these additional monomers may slow the overall process of conversion of HIPE to HIPE foam, the tradeoff being necessary if the desired property is to be conferred. Thus, it is desired in some cases to minimize the amount of such monomers to keep the slowing of the rate of conversion to a minimum, or to exclude these types unless needed.

The oil phase will further contain a effective amount of emulsifier necessary for stabilizing the HIPE. Such emulsifiers are generally well known to those skilled in the art and examples are provided infra.

The oil phase may also contain an oil soluble initiator such a benzoyl peroxide, di-t-butyl peroxide, lauroyl peroxide, azoisobutyronitrile, 2,2'-azobis(2,4-dimethylvaleronitrile), 2,2'-azobisisobutyronitrile, and other such initiators well known to those skilled in the art. When oil phase initiators are employed, it can be preferred that their addition to the monomer phase be immediately before or just during emulsification to reduce the potential for premature polymerization.

2. Aqueous Phase Components

The discontinuous aqueous internal phase of the HIPE is generally one or more aqueous solutions containing one or more dissolved components. One essential dissolved component of the water phase is a water-soluble electrolyte. The dissolved electrolyte minimizes the tendency of monomers, comonomers, and crosslinkers that are primarily oil soluble to also dissolve in the water phase. Such electrolyte can include a buffering agent for the control of pH during the polymerization, including such inorganic counterions as phosphate, borate, and carbonate, and mixtures thereof, for example.

Another component of the aqueous phase is a water-soluble free-radical initiator or a "polymerization initiator" as may be known to the art. The initiator can be present at up to about 20 mole percent based on the total moles of polymerizable monomers present in the oil phase. More preferably, the initiator is present in an amount of from about 0.001 to about 10 mole percent based on the total moles of polymerizable monomers in the oil phase. Suitable initiators include ammonium persulfate, sodium persulfate, potassium persulfate, 2,2'-azobis (N,N'-dimethyleneisobutyramidine) dihydrochloride, and other azo initiators of this type. A delayed initiator or free radical inhibitor can also be used. The delayed initiators will extend the curing time but will help to extend the life of the mixing equipment. A suitable delayed initiator is TEMP (2,2,6,6-53543methyl-1-piperidinyloxy) which can be obtained from Aldrich.

Yet another optional component is a potentiator of the initiator, including salts comprising the sulfite moiety. A preferred example is sodium hydrosulfite ($NaHSO_3$). Other examples include inorganic salts of reduced transition metals such as Fe(II) sulfate and the like. Small amounts of water soluble monomers may also be included. Examples include acrylic acid and vinyl acetate. The water soluble monomer may aid in making the surface of the HIPE more wettable.

Before combining the aqueous phase with the oil phase, it may be desired to degas the aqueous phase. Examples of processes to degas a component of a HIPE are included in U.S. Pat. No. 5,362,244 to DesMarais et al.

3. Emulsifier

The emulsifier is necessary for forming and stabilizing the HIPE. The emulsifier is generally included in the oil phase and tends to be relatively hydrophobic in character. (See for example Williams, J. M., *Langmuir* 1991, 7, 1370-1377.) For preferred HIPEs that are polymerized to make polymeric foams, suitable emulsifiers can include sorbitan monoesters of branched $C_{16}$-$C_{24}$ fatty acids, linear unsaturated $C_{16}$-$C_{22}$ fatty acids, and linear saturated $C_{12}$-$C_{14}$ fatty acids, such as sorbitan monooleate, sorbitan monomyristate, and sorbitan monoesters derived from coconut fatty acids. Preferred emulsifiers include sorbitan monolaurate (e.g., SPAN® 20, preferably greater than about 40%, more preferably greater than about 50%, most preferably greater than about 70% sorbitan monolaurate), sorbitan monooleate (e.g., SPAN® 80, preferably greater than about 40%, more preferably greater than about 50%, most preferably greater than about 70% sorbitan monooleate), diglycerol monooleate (e.g., preferably greater than about 40%, more preferably greater than about 50%, most preferably greater than about 70% diglycerol monooleate), diglycerol monoisostearate (e.g., preferably greater than about 40%, more preferably greater than about 50%, most preferably greater than about 70% diglycerol monoisostearate), diglycerol monomyristate (e.g., preferably greater than about 40%, more preferably greater than about 50%, most preferably greater than about 70% sorbitan monomyristate), the cocoyl (e.g., lauryl and myristoyl) ethers of diglycerol, and mixtures thereof.

Particularly useful are diglycerol monoesters of branched $C_{16}$-$C_{24}$ fatty acids, linear unsaturated $C_{16}$-$C_{22}$ fatty acids, or linear saturated $C_{12}$-$C_{14}$ fatty acids, such as diglycerol monooleate (i.e., diglycerol monoesters of C18:1 fatty acids), diglycerol monomyristate, diglycerol monoisostearate, and diglycerol monoesters of coconut fatty acids; diglycerol monoaliphatic ethers of branched $C_{16}$-$C_{24}$ alcohols (e.g. Guerbet alcohols), linear unsaturated $C_{16}$-$C_{22}$ alcohols, and linear saturated $C_{12}$-$C_{14}$ alcohols (e.g., coconut fatty alcohols), and mixtures of these emulsifiers. See U.S. Pat. No. 5,287,207 (Dyer et al.), issued Feb. 7, 1995 which describes the composition and preparation suitable polyglycerol ester emulsifiers and U.S. Pat. No. 5,500,451, issued Mar. 19, 1996 to Stephen A. Goldman et al., which describes the composition and preparation suitable polyglycerol ether emulsifiers. An exemplary emulsifier which functions very well is diglycerol monooleate (DGMO). Other emulsifiers of this general sort also include diglycerol monomyristate (DGMM), diglycerol monoisostearate (DGMIS), diglycerol monopalmitate (DGMP), other diglycerol monoesters of coconut fatty acids, sorbitan monooleate, sorbitan monomyristate, sorbitan monoesters of coconut fatty acids, sorbitan isostearate, and like compounds and mixtures thereof. U.S. Pat. No. 5,786,395 (Stone et al.) issued Jul. 28, 1998 offer further examples of these emulsifiers. Another preferred emulsifier, referred to herein as PGMIS, is a polyglycerol isostearate.

Another preferred emulsifier is described in copending U.S. Pat. No. 6,207,724, entitled Foam Materials and High Internal Phase Emulsions Made Using Oxidatively Stable Emulsifiers, filed in the name of Hird, et al. Such emulsifiers comprise a composition made by reacting a hydrocarbyl substituted succinic acid or anhydride or a reactive equivalent thereof with either a polyol (or blend of polyols), a polyamine (or blend of polyamines) an alkanolamine (or blend of alkanol amines), or a blend of two or more polyols, polyamines and alkanolamines. An exemplary emulsified which functions very well is polyglycerol succinate. The lack of substantial carbon-carbon unsaturation renders them substantially oxidatively stable.

Such emulsifiers are advantageously added to the oil phase so that they comprise between about 1% and about 15% thereof. Obviously, emulsifiers that are particularly able to stabilize HIPEs at high temperatures are preferred. Diglycerol monooleate (DGMO) is exemplary in this respect.

Coemulsifiers may also be used to provide additional control of cell size, cell size distribution, and emulsion stability, particularly at higher temperatures (e.g., greater than about 65° C.). Exemplary coemulsifiers include phosphatidyl cholines and phosphatidyl choline-containing compositions, aliphatic betaines, long chain $C_{12}$-$C_{22}$ dialiphatic, short chain $C_1$-$C_4$ dialiphatic quaternary ammonium salts, long chain $C_{12}$-$C_{22}$ dialkoyl(alkenoyl)-2-hydroxyethyl, short chain $C_1$-$C_4$ dialiphatic quaternary ammonium salts, long chain $C_{12}$-$C_{22}$ dialiphatic imidazolinium quaternary ammonium salts, short chain $C_1$-$C_4$ dialiphatic, long chain $C_{12}$-$C_{22}$ monoaliphatic benzyl quaternary ammonium salts, the long chain $C_{12}$-$C_{22}$ dialkoyl(alkenoyl)-2-aminoethyl, short chain $C_1$-$C_4$ monoaliphatic, short chain $C_1$-$C_4$ monohydroxyaliphatic quaternary ammonium salts. Particularly preferred is ditallow dimethyl ammonium methyl sulfate (DTDMAMS). Such coemulsifiers and additional examples are described in greater detail in U.S. Pat. No. 5,650,222, issued in the name of DesMarais, et al. on Jul. 22, 1997.

4. Optional Ingredients

Various optional ingredients may also be included in either the water or oil phase for various reasons. Examples include antioxidants (e.g., hindered phenolics, hindered amine light stabilizers, UV absorbers), plasticizers (e.g., dioctyl phthalate, dinonyl sebacate), flame retardants (e.g., halogenated hydrocarbons, phosphates, borates, inorganic salts such as antimony trioxide or ammonium phosphate or magnesium hydroxide), dyes and pigments, fluorescers, filler particles (e.g., starch, titanium dioxide, carbon black, or calcium carbonate), fibers, chain transfer agents, odor absorbers such as activated carbon particulates, dissolved polymers and oliogomers, and such other agents as are commonly added to polymers for a variety of reasons. Such additives may be added to confer color, fluorescent properties, radiation resistance, opacity to radiation (e.g., lead compounds), to disperse charge, to reflect incident infrared light, to absorb radio waves, to form a wettable surface on the HIPE foam struts, or for any other purpose.

B. Processing Conditions for Obtaining HIPE Foams

Foam preparation typically involves the steps of: a) forming a water-in-oil emulsion having an aqueous phase and an oil phase including a monomer component; b) curing the monomer component in the emulsion in a saturated steam environment; and c) forming a saturated polymeric form material. After Step c), it is optional to add the step of squeezing and washing the cellular polymeric structure to remove the original residual water phase from the polymeric foam structure and, if necessary, treating the polymeric foam structure with a hydrophilizing surfactant and/or hydratable salt to deposit any needed hydrophilizing surfactant/hydratable salt, and thereafter dewatering this polymeric foam structure.

a) Formation a Water-in-Oil Emulsion

The HIPE is formed by combining the water and oil phase components in a ratio between about 8:1 and 140:1. This is termed the "water-to-oil" or W:O ratio and is significant as it is the primary determinant of the density of the resulting dried HIPE foam. Preferably, the ratio is between about 10:1 and about 75:1, more preferably between about 13:1 and about 65:1. An exemplary W:O ratio is about 45:1. (The ratio is generally expressed as volume of aqueous phase to weight of organic phase.) As discussed above, the oil phase will typically contain the requisite monomers, comonomers, crosslinkers, and emulsifiers, as well as optional components. The water phase will typically contain electrolyte or electrolytes and polymerization initiator or initiators.

The HIPE can be formed from the combined oil and water phases by subjecting these combined phases to shear agitation. Shear agitation is generally applied to the extent and for a time period necessary to form a stable emulsion. Such a process can be conducted in either batchwise or continuous fashion and is generally carried out under conditions suitable for forming an emulsion where the water phase droplets are dispersed to such an extent that the resulting polymeric foam will have the requisite structural characteristics. Emulsification of the oil and water phase combination will frequently involve the use of a mixing or agitation device such as an impeller.

One preferred method of forming HIPE involves a continuous process that combines and emulsifies the requisite oil and water phases. In such a process, a liquid stream comprising the oil phase is formed. Concurrently, a separate liquid stream comprising the water phase is also formed. The two separate streams are provided to a suitable mixing chamber or zone at a suitable emulsification pressure and combined therein such that the requisite water to oil phase weight ratios previously specified are achieved. More than one stream of oil phase and water phase can also be used.

In the mixing chamber or zone, the combined streams are generally subjected to shear agitation provided, for example, by an impeller of suitable configuration and dimensions, or by any other means of imparting shear or turbulent mixing generally known to those skilled in the art. Examples of such alternative means of providing shear include in-line mixers as are described in commonly assigned U.S. Pat. No. 6,369,121 B1 (Catalfamo et al), issued Apr. 9, 2002. Shear will typically be applied to the combined oil/water phase stream at an appropriate rate and extent. Once formed, the stable liquid HIPE can then be withdrawn or pumped from the mixing chamber or zone. One preferred method for forming HIPEs using a continuous process is described in greater detail in U.S. Pat. No. 5,149,720 (DesMarais et al), issued Sep. 22, 1992. See also commonly assigned U.S. Pat. No. 5,827,909 (DesMarais) issued on Oct., 27, 1998 which describes an improved continuous process having a recirculation loop for the HIPE. The process also allows for the formation of two or more different kinds of HIPEs in the same vessel as disclosed in U.S. Pat. No. 5,817,704 (Shiveley et al.) issued Oct. 6, 1998. In this example, two or more pairs of oil and water streams may be independently mixed and then blended as required.

Many different variations of the above described process for forming the emulsion may be used. A multistage mixing process where the water to oil ratio is increased after the initial emulsion is formed may also be used. An initiator may also be added in separate steps.

b) Curing the Monomer Component in the Oil Phase of the Water-in-Oil Emulsion

The process of the present invention has a step of curing the monomer component in the oil phase of the water-in-oil emulsion using a polymerization reaction to form a saturate polymeric foam material. The HIPE may be cured in a batch process or in a continuous process. A measure of the extent of cure of the polymer is the strength of the foam, as measured by the yield stress. Another measure of the extent of cure of the polymer is the extent to which it swells in a good solvent such as toluene (being crosslinked, the HIPE foam does not dissolve without being chemically altered). A suitable curing step is described in U.S. Pat. No. 6,365,642 (Dyer et al.) issued Apr. 2, 2002.

During the curing, the monomer in the emulsion is reduced because of evaporation. The evaporation rate is affected by the such factors as the turbulence of the atmosphere above the emulsion, the monomer content of the atmosphere, the reaction rate of polymerization, and the temperature of the atmosphere and the temperature of the emulsion. Additionally, loss of water from the internal phase due to rapid evaporation can cause the emulsion at the surface to break, creating defects such as an occluded surface, especially harmful if the intended use of the emulsion is as an absorbent foam.

Thus, there is a need to reduce such a monomer loss and any evaporation of either monomer or aqueous internal phase. As the monomer loss would occur because of an exposed surface, a film covering is conventionally utilized. However, these films can also cause surface defects by interaction with the emulsion, or can be difficult to keep clean if the intent is to use them over and over for economy, or very expensive is the intent is to only use them once.

The present invention achieved to prevent the monomer loss by performing the curing process in a saturated steam environment with little movement of the atmosphere above the emulsion. Preferably, the saturated steam is in equilibrium with the emulsion. The temperature of the steam is preferably greater than 90 degrees C., more preferably, greater than 95 degrees C., further more preferably, greater than 987 degrees C. It is also desired that the polymerization proceed quickly to further reduce any evaporation of the monomer.

Without being bound by theory, it is believed that such a saturated steam can work for (1) raising the temperature of the emulsion from Step a) and making the curing process end faster and (2) preventing evaporation of the water from the aqueous phase, and the quiescent atmosphere above the emulsion becomes rapidly in equilibrium with the monomer components without much loss of monomer. As a result, the method of the present invention can reduce the monomer loss during the curing less to than 10%, preferably, less than 5%, more preferably, less than 3.5%.

One of the advantages of the present invention is the ability to heat up the emulsion to a higher temperature where the reaction takes place more quickly without suffering losses from monomer evaporation. This allows for the use of lower temperatures in mixing and sheet forming, which reduces the buildup of reacted material in the mixing and sheet forming equipment. Another way to reduce buildup of reacted material is the use of free radical inhibitors. These typically suffer from the trade-off of extending both the life of the equipment and the cure time required. One such free radical inhibitor that helps in the inhibition in the mixing equipment while not prolonging curing to an unacceptable amount of time was TEMPO (2,2,6,6-tetremethyl-1-piperidinyloxy) which can be obtained from Aldrich.

The HIPE is formed in a continuous process, as is shown schematically in FIG. 1. If the vessel is closed and adequately pressure resistant, the curing temperature can be increased beyond 100° C. as needed. Another preferable oven is described in U.S. Pat. No. 5,634,281 (Nugent et al.) issued Jun. 3, 1997. In the present invention, the curing process is preferably performed in an oven. The oven most preferably has a serpentine design. The serpentine design can have any number of tiers to meet the material and space requirements. The serpentine design is cost effective as the oven itself takes up a minimal amount of floor space compared to other oven designs.

The oven can utilize belts to support the HIPE foams during the curing process. The belts can be configured to a serpentine design or other desired formation. The belts are more cost efficient as they do not require the tight specifications often found in conveyors commonly used in the industry. The belts do not require high tension, allow for smaller diameter pulleys, allow for the stacking and serpentining set-up, and permit quick changes and simple maintenance. The low speed and supporting equipment such as slider bed technology, bearings, and pulleys all make this oven design very cost effective. The belts additionally allow for manipulation of the HIPE surface. For example, if the belt material is incompatible with the foam, the foam structure collapses leaving a heavily occluded surface which is impermeable. This may be desired for a foam material having one side impermeable and one side permeable. The steam cured side of the foam material, which is permeable, can be misted with water, particulates, organic materials, or any desired substance. The belts may also be coated with a material. Suitable materials include Teflon.

Figure 2:
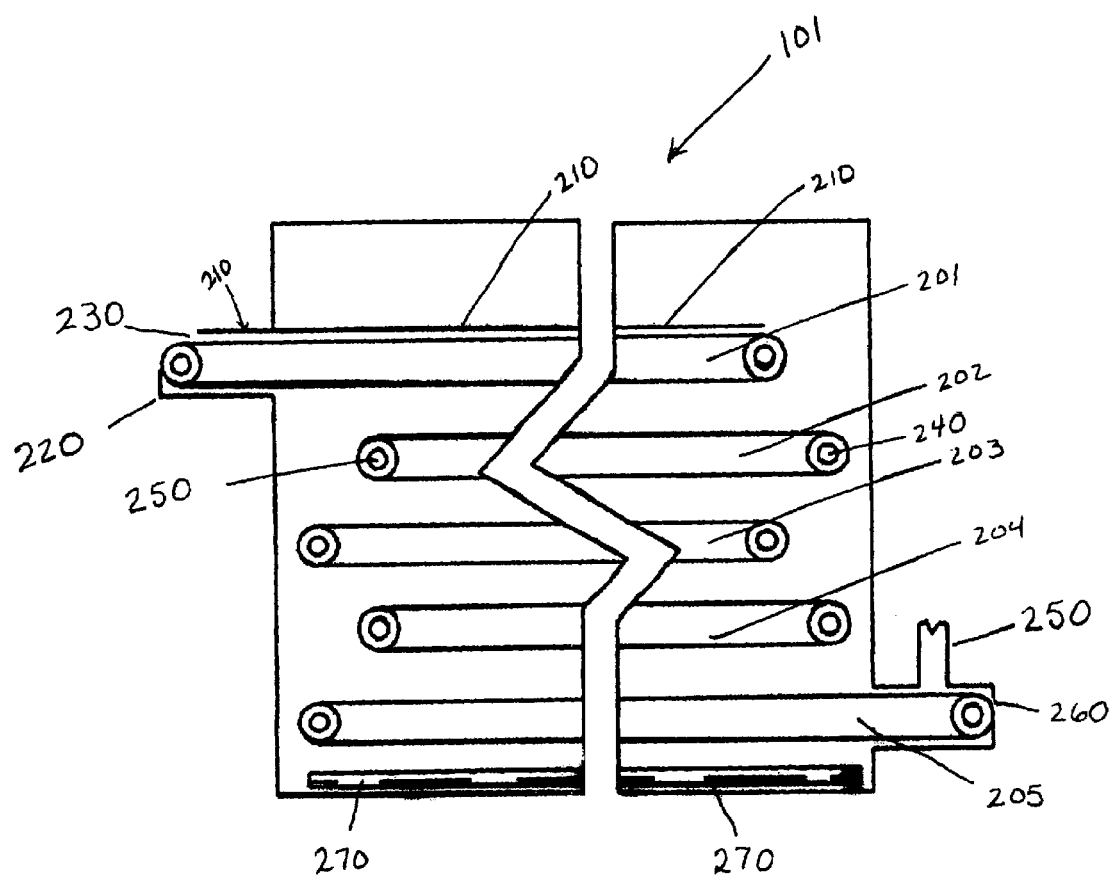
FIG. 2 describes a cutaway view of the oven showing the relationship of belts.
Figure 3:
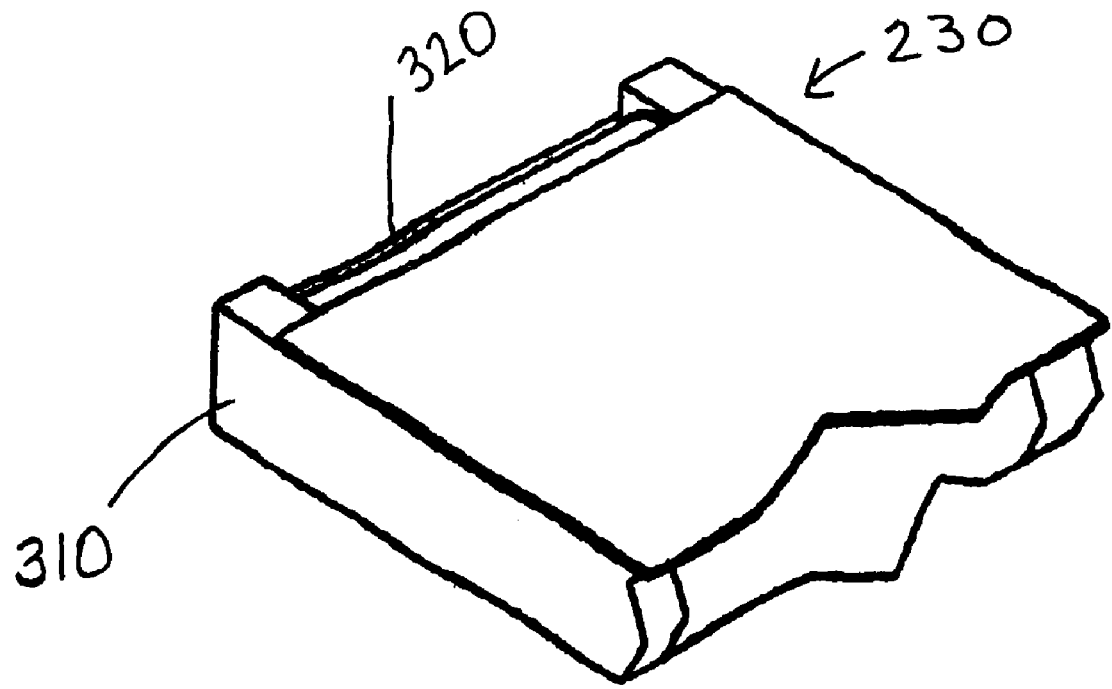
FIG. 3 describes a detailed view of a deposition area at the entrance to the oven.

FIG. 1 describes an overall view of an oven suitable for forming HIPE foams according to the present invention. FIG. 2 describes a cutaway view of the oven, detailing the first and last modules (which may be one module if desired) with the broken lines exemplifying that other modules could be contained within, and showing the relationship of belts. FIG. 3 describes a detailed view of a deposition area.

In FIG. 1, the oven 100 comprises four modules. Each module 101 has a vent 110, a vent collection 120 and a steam inlet 130. The vent collection 120 connects vent 110 and module 101. The steam enters at the steam inlet 130 and goes through from vent 110.

In FIG. 2, the oven is shown with five belts, 201, 202, 203, 204, and 205. Belt 201, the top belt, is covered with a close fitting cover 210. At left end of belt 201, where the material enters the oven 101 at the deposition area 230, a bottom belt seal 220 typically constructed of a non-abrasive material such as rubber, contacts the belt 201 to prevent steam leakage. Belt 201 terminates at deposition area 230 which is for deposition of the emulsion from the die. Belt 202 starts from tail pulley 240 and ends at drive pulley 250 as other belts do. The right hand module has further a discharge opening 260 through which the cured emulsion exits and a steam balancing vent 250 which is powered by a variable speed exhaust fan in order to be able to adjust the pressure pulling the steam out of the discharge opening 260 in order to keep steam from naturally rising and exiting from the higher entry. If the entry and exit are on the same level, for example if there is only one oven belt, then the steam balancing vent may not be needed. At the bottom of each module 101, there is a steam distribution 270, in which steam is distributed.

In FIG. 3, the deposition area 230 is shown in detail. Deposition area 230 has a pulley seal 310 and belt seals 320. The belt seals are conveniently cut from a non-abrasive material such as rubber and have approximately the same arc as the belt so as to seal the steam in the oven. The pulley seal 310 is conveniently constructed of sheet metal and surrounds the support member and belt so that steam does not escape though the space between the incoming and outgoing belt as it proceeds to the pulley. The discharge end is comparably equipped with bottom seals and belt seals.

A porous, water-filled, open-celled HIPE foam is the product obtained after curing in the polymerization reaction. Sheets of cured HIPE foam are easier to process during subsequent treating/washing and dewatering steps, as well as to prepare the HIPE foam for use in the intended application. Alternatively, the product HIPE foam may be cut, ground or otherwise comminuted into particles, cubes, rods, spheres, plates, strands, fibers, or other desired shapes. The aqueous phase remaining with the HIPE is typically removed by compressing the foam. Residual moisture can be removed as desired by conventional evaporative drying techniques.

C. SPECIFIC EXAMPLES

Example 1

An oil phase is prepared comprising 50.91% EHA, 31.82% EGDMA, 5.45% EHMA, 2.73% HDDA, 7.27% polyglycerol succinate, and 1.82% DTDMAMS. An aqueous phase is prepared comprising 3.85% $CaCl_2$, pH adjusted to 6.3. The aqueous phase is heated to 72° C. and pumped at a volumetric flow rate of 5.037 l/min through a tube, a 4.76 mm diameter hole drilled through a 19.05 mm set screw in the top mounting plate of a dynamic mixer. The dynamic mixer comprises a 7.82 cm diameter shell with a 28.58 mm shaft mounted with 3 rows of 58 3.18 mm pins positioned 120° with respect to each other around the circumference with a center to center distance between each pin along the shaft of 3.23 mm, with another set of 3 rows of 58 3.18 mm pins offset from first set by 60° and offset on the shaft such that they are halfway between the other set of rows. Thus, the rows, if they were free to bypass one another would have a clearance of about 0.025 mm The length of the shaft pins is such that the shaft pin to shell gap is 3.05 mm. The aqueous stream enters the vertically positioned mixer approximately 2 cm above the first row of pins on the shaft, which rotates at about 800 RPM. Fluids are withdrawn from the bottom of the mixer, and a portion is directed to a Waukesha Model 030 U2 lobe pump. At the inlet to the pump the unheated oil phase is injected at a rate of 251.6 grams per minute through a 1.98 mm hole drilled in a 6.35 mm set screw mounted in a section of tubing that entered the center of a 90° elbow and directs the stream in a path parallel with the fluid flowing from the mixer through a 1.91 cm diameter section of stainless steel tubing. All mixer parts and tubing and connection are stainless steel with sanitary fittings. The discharge of the pump, rotating at an RPM to give a flow of 5.5 l/min, is conveyed back to the top of the mixer, which has a 1.91 cm entry just below the mounting flange, nearly concentric with the first row of pins on the shaft. In this way fresh aqueous phase is introduced into a more highly concentrated emulsion. The product of the first mixer is a HIPE with small droplets of internal phase at an internal phase ratio of about 20:1 cc/gram.

The other portion of the material withdrawn from the mixer is directed to a another dynamic mixer via an entry identical to the one described for the first mixer's recirculation line, with the same shell as the first The impeller pin diameter is 4.76 mm and there are only 2 pins per row offset by 180°, with 34 rows spaced approximately 11.1 mm on center, and a complementary set of another 34 rows with 2 pins per row offset by 90° from the first row and spaced halfway between rows. The second portion of the aqueous phase which is heated to 70° (to approximately match the temperature of the emulsion leaving the first mixer) and is flowing at 3.962 l/min is introduced through a 3.97 mm diameter hole drilled through a 19.05 mm set screw in the top mounting plate of the second dynamic mixer approximately 2 cm above the first pin row. The pin-shell gap is 6.35 mm and the impeller is rotating at 1000 RPM. The resultant, small droplet internal phase emulsion has an internal phase ratio of about 35.8:1 The emulsion from the second mixer is directed to the bottom of a third mixer, a vertically oriented dynamic mixer with a 5.23 cm diameter shell having an impeller pinned along 21.59 cm of its length. The impeller shaft is 1.91 cm in diameter with one row of 4.76 mm pins having 21 rows of three pins per row offset from each other by 120°, and with another 21 rows of three similar pins per row, 60° offset from the first row of pins. The pins are spaced 10.5 mm on centers, with the rows offset by half that distance. The pin to wall gap is 3.05 mm, and the mixer rotates at about 1800 RPM. The initiator phase comprises 11.4% sodium persulfate in potable city water, and its flow of 60.3 g/min is introduced into the bottom of the mixer through a 1.59 mm diameter hole drilled in a 6.35 mm tube centered on the mass center of the annulus formed by the shaft and shell, again directed parallel to the mass flow entering the bottom of this mixer. The resultant emulsion, now about 36:1 internal phase ratio, is directed to a die similar to that used in standard extrusions, called a coat-hanger die. The die has an exit gap of 2.6 mm and a width of 25 cm. The emulsion issuing from the die is collected on a Teflon coated belt moving at 8 m/min to convey the emulsion through a serpentine curing chamber with 5 levels and 7 sections, each 2.5 meters long. The entry and exit of the oven have powered ventilation to capture escaping steam, the top belt is about 0.6 m below the top of the chamber, and each section is fitted with a ventilation port 10 cm in diameter. The ports are piped to dampers that can restrict the flow but not stop it completely. The exit from the dampers is piped to a central conduit and then to an exhaust fan nominally rated at 150 cubic meters per minute. Material balance samples lost 25 to 30% of the incoming monomer weight, or about 31 to 38 grams/square meter of product produced.

Example 2

The same emulsion, die and oven were used as in example 1, but the top level of the oven was fitted with a close fitting cover. The cover is higher in the middle than on the sides in order to allow any steam condensate to run to the edge rather than drop on the curing web. The cover is about 5 cm above the belt in the middle and about 4 cm at the edge. Material balance samples lost 10 to 12% of the incoming monomer weight, or about 13 to 15 grams/square meter of product produced.

Example 3

The same emulsion, die, and oven with close fitting covers on the top level conveyor as used in example 2 was modified to eliminate the internal ventilation ports. The material balance samples lost between 4 and 6% of the incoming monomer weight, or about 5 to 8 grams/square meter of product produced.

Example 4

The same emulsion, die, and oven as modified in example 3 was further modified to gasket all areas where steam might leak out of the entry and exit of the oven except in the places where emulsion enters and cured material exits. Also, the exhaust fan at the entry was eliminated, and the exhaust fan at the exit was equipped with a variable speed drive. The exit fan speed was adjusted until no steam was observed to exit from the front of the oven, taking care not to have it too fast as to pull in cold air from the front of the oven with the incoming emulsion. Without being limited by theory, the intent of the exhaust fan at the exit of the oven is to overcome the natural tendency of hot gasses to rise, creating a chimney effect in a curing chamber. Without the exit fan pulling the rising gas back, air rushes in the exit to displace the steam, and this can be observed both by the great increase in condensing steam vapor coming out of the entry to the oven and by the much lower temperature of a thermocouple positioned within the last section of the oven 1 meter from the exit. The material balance samples from this example are difficult to evaluate within the noise of the method. Stack measurements using condensing tubes indicate less than 3.2 grams per square meter of product is lost, or less than about 2% of the incoming monomer.

The disclosures of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

While various embodiments and/or individual features of the present invention have been illustrated and described, it would be obvious to those skilled in the art that various other changes and modifications can be made without departing from the spirit and scope of the invention. As will be also be apparent to the skilled practitioner, all combinations of the embodiments and features taught in the foregoing disclosure are possible and can result in preferred executions of the invention. It is therefore intended to cover in the appended claims all such changes and modifications that are within the scope of this invention.

What is claimed is:

1. A method for reducing monomer loss during curing of a high internal phase emulsion comprising the steps of:
   a. forming a water-in-oil emulsion comprising an aqueous phase and an oil phase comprising a monomer component;
   b. depositing the water-in-oil emulsion on a moving belt;
   C. transporting the water-in-oil emulsion on the belt to an oven;
   d. curing the monomer component in the emulsion in a saturated steam environment in an oven with a quiescent atmospheric layer above the emulsion; and
   e. forming a flexible saturated polymeric foam material.

2. The method according to claim 1 wherein the monomer loss is less than 5% during curing.

3. The method according to claim 2 wherein the saturated steam is in equilibrium with the emulsion.

4. The method according to claim 2 wherein a small head space above the emulsion in present in Step d.

5. The method according to claim 4 wherein the head space is less than 80 mm.

6. A method of forming a polymeric foam material comprising the steps of:
   a. forming a water-in-oil emulsion;
   b. depositing the water-in-oil emulsion on a moving belt;
   c. transporting the water-in-oil emulsion on the belt to an oven;
   d. curing the emulsion in a saturated steam environment in an oven with a quiescent atmospheric layer above the emulsion; and
   e. forming a flexible saturated polymeric foam material.

7. The method according to claim 6 wherein the oven is a serpentine design.

8. The method according to claim 6 wherein the oven has an exit and entrance point which are covered.

9. The method according to claim 7 wherein the serpentine design is formed from belts.

10. The method according to claim 9 wherein the belts are cleaned at ends of the paths.

11. A method of forming a polymeric foam material comprising the steps of:
    a. forming a water-in-oil emulsion comprising an aqueous phase and an oil phase comprising a monomer component;
    b. depositing the water-in-oil emulsion on a moving belt:
    c. transporting the water-in-oil emulsion on the belt to an oven;
    d. curing the monomer component in the emulsion in an oven comprising a serpentine design, a small head space above the emulsion, and a saturated steam environment in equilibrium with the emulsion; and
    e. forming a flexible saturated polymeric foam material.

* * * * *

UNITED STATES PATENT AND TRADEMARK OFFICE
CERTIFICATE OF CORRECTION

PATENT NO. : 7,393,878 B2 Page 1 of 1
APPLICATION NO. : 11/070322
DATED : July 1, 2008
INVENTOR(S) : Thomas Allen Desmarais et al.

It is certified that error appears in the above-identified patent and that said Letters Patent is hereby corrected as shown below:

Cover Page
Other Publications, line 5, delete "1005" and insert --1995--.

Column 14
Line 8, delete ":" and insert --;--.

Signed and Sealed this

Thirtieth Day of December, 2008

JON W. DUDAS
*Director of the United States Patent and Trademark Office*